UNITED STATES PATENT OFFICE.

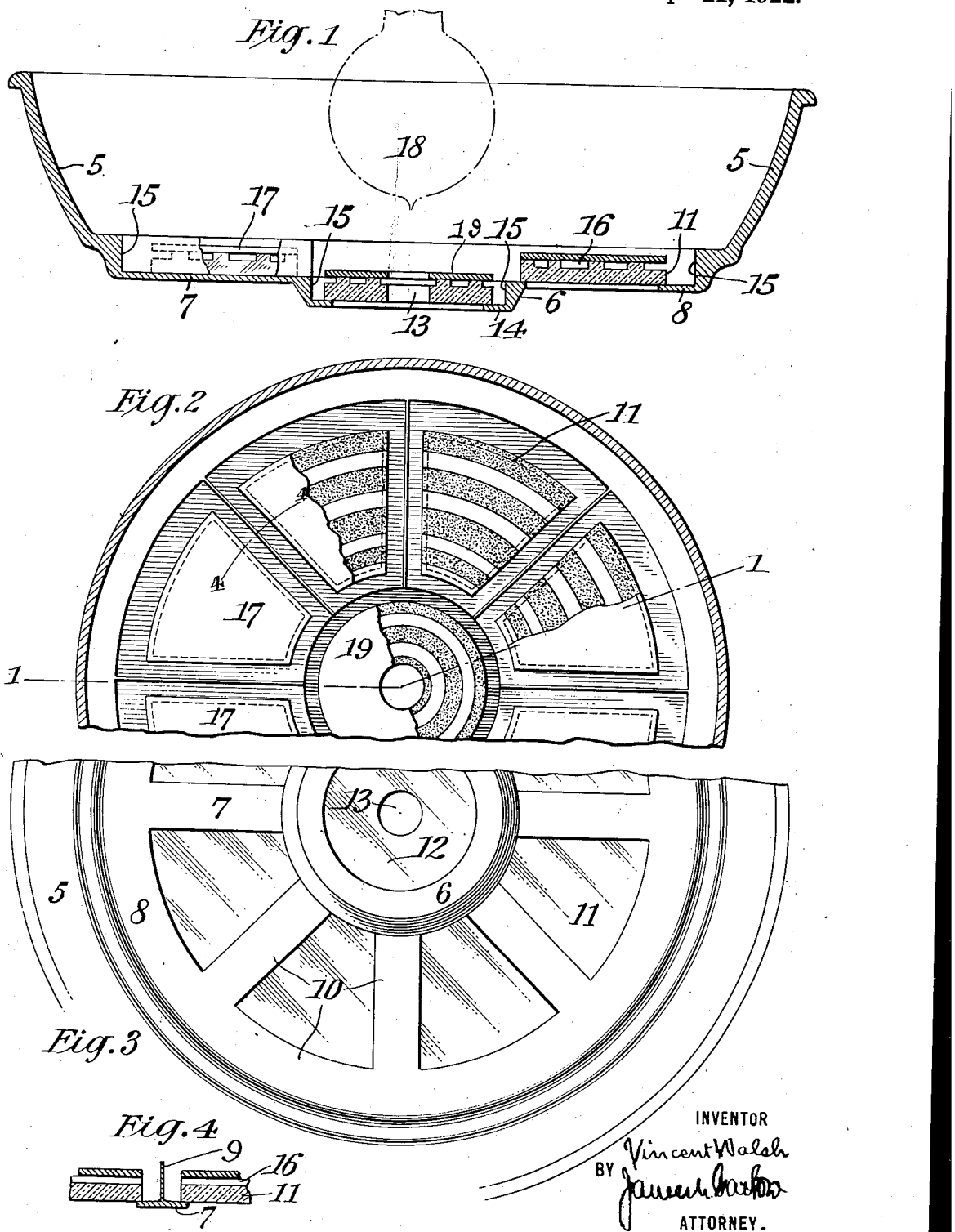

VINCENT WALSH, OF NEW YORK, N. Y.

LIGHT-DIFFUSING MEDIUM.

1,412,432.  Specification of Letters Patent.  Patented Apr. 11, 1922.

Application filed July 9, 1920. Serial No. 395,000.

*To all whom it may concern:*

Be it known that I, VINCENT WALSH, a citizen of the United States, residing in the borough of Manhattan, city, county, and State of New York, have made a certain new and useful Improvement in Light-Diffusing Mediums, of which the following is a specification, reference being had to the accompanying drawings, which form a part of the same.

The object of my invention is to provide a system of diffused light, and particularly that produced through the agency of an electric lamp. Other advantages of my invention will be apparent from an understanding of the same.

In the drawings,

Fig. 1 is a cross-section of my light diffusing medium taken along the line 1—1 of Fig. 2;

Fig. 2 is a fragmental plan view of my light diffusing medium, with parts broken away, looking at the same from the top;

Fig. 3 is a fragmental plan view of my light diffusing medium looking at the same from the bottom; and Fig. 4 is a detail cross-section taken along the line 4—4 of Fig. 2.

Referring now in detail to the drawings, in which similar characters refer to similar parts throughout, 5 is a frame which may be made of any suitable material, having the central hub 6, and radial strips 7 extending between the rim 8 of the frame and the hub 6. The hub 6 is preferably arranged in lower plane than the rim 8, as shown. Extending longitudinally of the strips 7, I have provided central partitions 9, forming with the strips 7, segmental frames 10 in the frame 5.

Adapted to fit in the segmental frames 10, I have provided a plurality of glass plates 11, which are shown in Fig. 2 as being provided with arcial stripes sandblasted thereon. The strips 7 of the segmental frames 10 form retaining flanges for the plates 11, and the partitions 9 prevent lateral displacement thereof.

In the hub 6, I have shown the plate 12, preferably circular, having a vent 13. This plate is adapted to rest on the flange 14.

Spaces are provided between the plate segments and the inside of the frame 5, and between the plate 12 and the inside of the hub 6, and also between the partitions 9 and the plates 11 as shown. The inside surfaces of the frame are provided with reflecting surfaces 15, as are also the surfaces of the partitions 9.

The recesses 16 represent sandblasted or figured portions of the plate. I have also provided reflectors 17 which are adapted to increase the projection of light from the plates 11 and 12 respectively, and which are preferably provided with reflecting surfaces on both sides.

In operation, I have provided a lamp 18, which may be suspended or mounted in any desirable manner. Surrounding this lamp is the assembly embodying the diffusing elements for the light emanating from the lamp. The rays from the lamp are adapted to strike the reflecting surfaces of the assembly including the inner portion of the frame 5, the reflecting surfaces 15, the said reflecting surfaces 15 being the surfaces of upwardly extending continuous walls in the frame 5, and the upper reflecting surfaces of the reflectors 17 and 19. The effect of this arrangement is to project light from the lamp 18, by reflection through the edges of plate sectors 11 and plate 12, from which the same is shed, being intensified by the reflectors 17 and 19.

Claims.

1. In a light diffusing medium, a dished frame provided with an inwardly extending flange, a dished central element provided with an inwardly extending flange, and strips connecting the first mentioned flange with said central element leaving openings between adjacent strips.

2. In a light diffusing medium, a dished frame provided with an inwardly extending flange, a dished central element provided with an inwardly extending flange, strips connecting the first mentioned flange with said central element leaving openings between adjacent strips, and transparent plates adapted to cover said openings.

3. In a light diffusing medium, a dished frame provided with an inwardly extending flange, a dished central element provided with an inwardly extending flange, strips connecting the first mentioned flange with said central element leaving openings between adjacent strips, partitions extending longitudinally along said strips and midway between their longitudinal edges, and transparent plates adapted to cover the aforesaid openings, said plates being of such size as to provide for an open space between their edges and adjacent partitions.

4. In a light diffusing medium, a dished frame provided with an inwardly extending flange, a dished central element provided with an inwardly extending flange, strips connecting the first mentioned flange with said central element leaving openings between adjacent strips, partitions extending longitudinally along said strips and midway between their longitudinal edges, and transparent plates adapted to cover the aforesaid openings, said plates being of such size as to provide for an open space between their edges and adjacent partitions, and a transparent plate adapted to cover the opening between the flange of the central element of such size as to provide for an open space between its edge and the side wall of said central element.

5. In a light diffusing medium, a dished frame embodying a reflecting wall arranged to receive light from the light source and an inwardly extending continuous flange therefrom, having an opening within said continuous flange, and a transparent plate adapted to cover said opening and to receive light from the reflecting wall said opening being of such size as to provide for an open space between its edge and the said wall of said frame.

6. In a light diffusing medium, a dished frame embodying a reflecting wall arranged to receive light from the light source and an inwardly extending continuous flange therefrom having an opening within said continuous flange, and a transparent plate adapted to cover said opening and to receive light from the reflecting wall, said opening being of such size as to provide for an open space between its edge and the said wall of said frame, and a reflector adapted to cooperate with said plate.

VINCENT WALSH.